Figure 1:
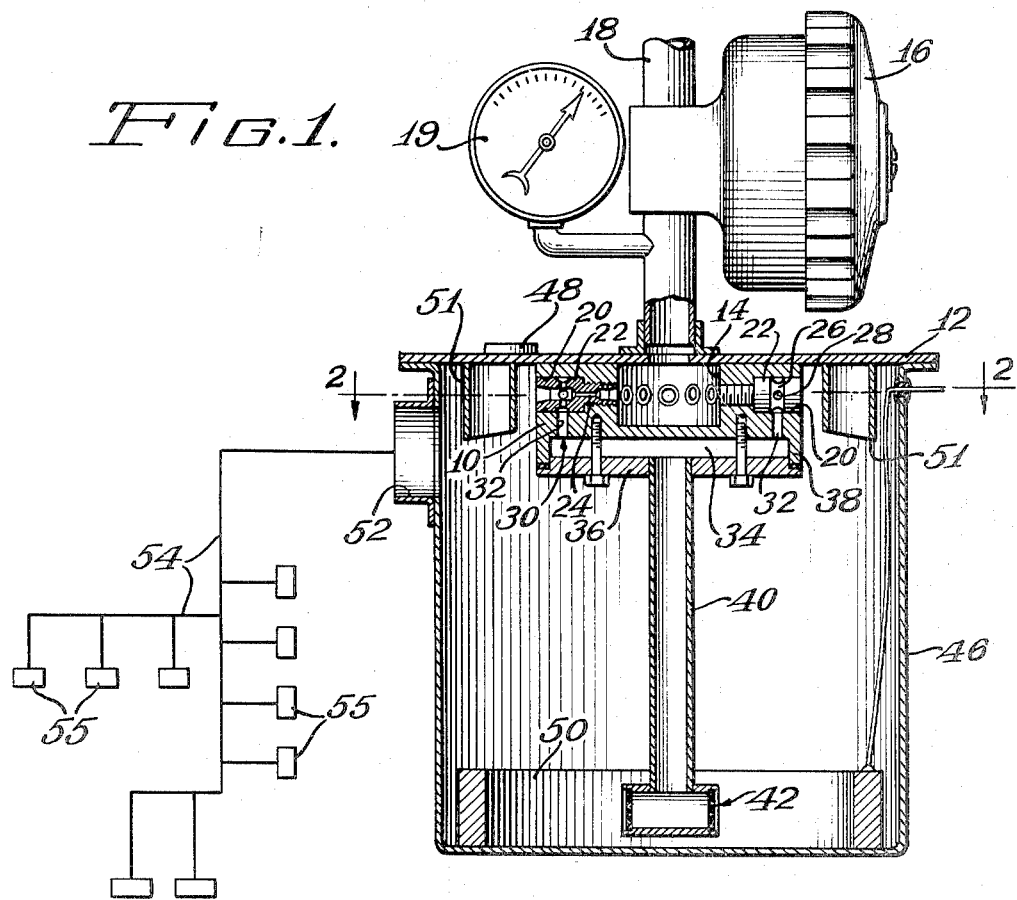

July 3, 1956      H. R. TEAR      2,753,013

HIGH CAPACITY OIL MIST GENERATOR

Filed Dec. 29, 1953

Inventor:
Harry R. Tear
By Ahlberg, Hupper, & Gradolph
Attorneys.

2,753,013
Patented July 3, 1956

United States Patent Office

2,753,013
HIGH CAPACITY OIL MIST GENERATOR

Harry R. Tear, Evanston, Ill., assignor to Stewart-Warner Corporation, Chicago, Ill., a corporation of Virginia Application December 29, 1953, Serial No. 401,000

3 Claims. (Cl. 184—55)

The present invention relates to oil mist generators for centralized lubricating systems designed to lubricate a number of bearing surfaces with a fine mist or aerosol of lubricant.

In general the oil mist is produced by a venturi nozzle which draws oil into a high speed air stream flowing through the throat of the nozzle. Due to the complex phenomenon of fluid mechanics involved, the development of a satisfactory nozzle, which will produce mist particles of proper size and correctly proportioned to the air volume, is a tedious and difficult undertaking. Moreover, a properly designed nozzle will operate efficiently within only a limited output range. Yet, different lubricating installations may require widely different quantities of mist, the variations of the mist requirements for different installations going far beyond the operational range of a single nozzle.

One object of the invention is to provide a compact, economical, oil mist generator of a flexible design that is readily adaptable without tedious calculations and development to produce an oil mist of optimum quality at the widely different rates needed for various high capacity lubricating installations.

A further object is to provide a high capacity mist generator of the above character which is inherently suited to be easily installed, controlled and serviced.

Figure 2:
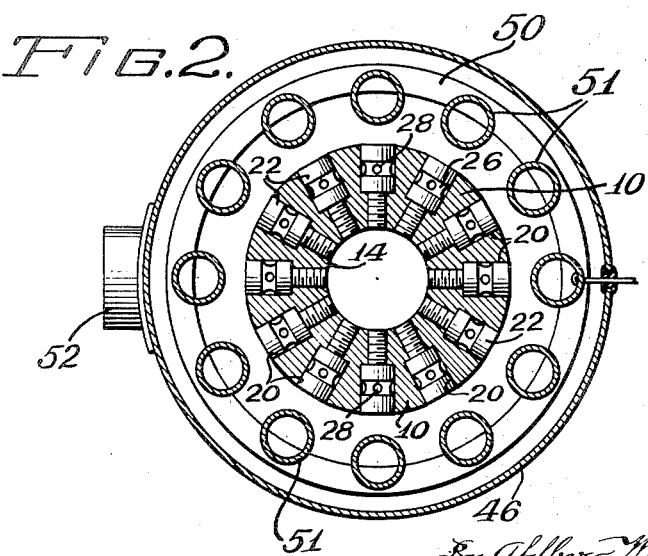

Other objects and advantages will become apparent from the following description of the form of the invention shown in the drawing, in which:

Figure 1 is a side view, largely in section, showing a mist generator embodying the invention and illustrating diagrammatically the connection of the generator to a centralized lubricating system; and Fig. 2 is a sectional view taken along the line 2—2 of Fig. 1.

The illustrated mist generator embodying the invention comprises a circular manifold block 10 brazed or otherwise secured to the underside of a circular cover plate 12. An air manifold 14 is formed in the center of the block 10 by a large bore (also denoted by the numeral 14) extending downwardly into the block and covered by the plate 12. Air under an adjustable, controlled pressure is supplied to the manifold 14 through a pressure regulator 16 of conventional construction connected to the manifold and adapted to be connected to a line 18 from a suitable source of air under pressure. The pressure of air supplied to the manifold 14 is indicated by a suitable gauge 19.

A series of twelve circumferentially spaced bores 20, each counterbored from the outer end, extend radially through the manifold block 10 to communicate with the air manifold space 14. Twelve nozzles 22 having an overall stepped cylindrical shape are threaded into the respective bores 20. Each nozzle is of a standard design proven in conventional generators.

A venturi passageway 24 extends axially through each nozzle 22 to communicate with the manifold 14. An annular passageway 26 cut into the exterior surface of each nozzle is connected with the venturi throat within the nozzle by a number of radial bores 28.

All the nozzles 22 are supplied with oil from an oil manifold 30 formed generally in the lower portion of the manifold block 10. As shown, the oil manifold 30 comprises a circumferential series of vertical bores 32 extending downwardly through the manifold block 10 from the respective nozzle passageways 26 to communicate with a circular chamber 34 formed by the lower face of the manifold block and a disc-like plate 36 bolted in fluid-tight peripheral engagement with a circular flange 38 extending downwardly from the lower face of the manifold block 10.

The chamber 34 communicates with the upper end of a vertical suction tube 40 fixed in a central aperture in the plate 36. The tube 40 extends downwardly from the plate 36 to a screen 42 near the bottom of an oil reservoir 46 fixed to the underside of the cover plate 12, which is provided with a filter cap 48.

A thermostatically controlled electrical heater 50 of conventional construction is placed in the lower end of the reservoir 46 to maintain the oil supply at a suitable operating temperature.

An annular series of cylindrical baffles 51, brazed or otherwise secured to the underside of the cover plate 12, extend downwardly in aligned spaced relation to the respective nozzles 22 to collect the larger droplets of the mist issuing from the nozzles. Liquid impinging on the baffles 51 drops back into the reservoir.

The upper end of the casing 46 forms a collector for the mist produced by all the venturi nozzles 22. The mist passes out through a common outlet 52 in the casing 46 through distribution conduits 54 to bearings, or coalescing fittings 55, only a few of which are diagrammatically illustrated in Fig. 1.

The nozzles 22, which are identical, are designed to produce an oil mist in which the oil particles are of optimum size and correctly proportioned to the air content of the mist for most efficient lubrication of bearing surfaces. The tedious and expensive effort of designing and developing suitable nozzles 22 for use in the high capacity generator thus provided is avoided by using relatively small capacity nozzles of a conventional design having known operating characteristics proven by use in conventional mist generators.

The generator shown is equipped with twelve nozzles 22 to provide the high output capacity required by large lubricating systems. The overall mist generating rate can be varied over a wide range by adjusting the air pressure in the manifold 14. The effective range of operating capacity can be increased or decreased by varying the number of the nozzles 22 used together. A number of the nozzle bores 20 in the manifold block 10 can be plugged to reduce the operating capacity without affecting the quality of the mist generated.

It will be appreciated that even though a plurality of mist producing nozzles 22 are used in the generator all the nozzles operate together from a common oil manifold and a common air manifold. The single pressure regulator 16 and the air gauge 19 serve to control the overall capacity of the generator within its operating range.

Formed as a single, self-contained unit, the generator is inherently adapted for easy installation and servicing.

The oil supply is maintained at a suitable operating temperature in cold weather by a single heater 50.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. A high capacity oil mist generator for a centralized lubricating system comprising, in combination, an air pressure regulator adapted to be connected to a suitable source of air under pressure, means including a circular block defining an air manifold connected to the outlet of the pressure regulator, an air pressure gauge communicating with the air manifold, a circumferentially spaced series of radial bores formed in the manifold block and communicating with the manifold, a plurality of oil mist generating nozzles mounted in said respective bores and defining venturi passageways communicating with the air manifold, each of the nozzles having an oil passageway communicating with the venturi passageway therein, a circumferentially spaced series of vertical bores extending downwardly through the block from the oil passageways of the respective nozzles, means on the lower end of the manifold block defining therewith a chamber communicating with all of said vertical bores, a casing forming an oil reservoir, conduit means extending from the chamber to the lower end of the oil reservoir, and means for collecting and discharging the mist generated by all of the nozzles.

2. A high capacity oil mist generator for a centralized lubricating system comprising, in combination, an air pressure regulator adapted to be connected to a supply of air under pressure, means defining an air manifold connected with the outlet of the air pressure regulator, an air pressure gauge communicating with the manifold, a plurality of mist generating nozzles mounted in said air manifold means, each nozzle having a venturi passageway therein communicating with the manifold and opening outwardly therefrom, an oil reservoir, an oil manifold connected with the reservoir, means forming a connecting passageway between the oil reservoir and each of the nozzles, a plurality of baffles mounted with one baffle disposed in opposing spaced relation to the outlet end of each nozzle, and means for collecting and discharging the mist generated by all of the nozzles.

3. A high capacity oil mist generator for a centralized lubricating system comprising, in combination, an air pressure regulator adapted to be connected to a suitable source of air under pressure, means including a block defining an air manifold connected to the outlet of the pressure regulator, an air pressure gauge communicating with the air manifold, a series of spaced bores formed in the manifold block, the bores communicating with the manifold and opening outwardly therefrom, a plurality of oil mist generating nozzles mounted in said respective bores and defining venturi passageways communicating with the air manifold, each of the nozzles having an oil passageway communicating with the venturi passageway therein, means on the manifold block defining an oil chamber separate from the air manifold, the block defining connecting bores between said chamber and the oil passageways of said respective venturi nozzles, a casing forming an oil reservoir, conduit means extending from the oil chamber to the lower end of the oil reservoir, and means for collecting and discharging the mist generated by all of the nozzles.

References Cited in the file of this patent

UNITED STATES PATENTS

| 2,610,700 | Gothberg | Sept. 16, 1952 |
| 2,620,429 | Boger et al. | Dec. 2, 1952 |

FOREIGN PATENTS

| 408,900 | Great Britain | Apr. 19, 1934 |